UNITED STATES PATENT OFFICE.

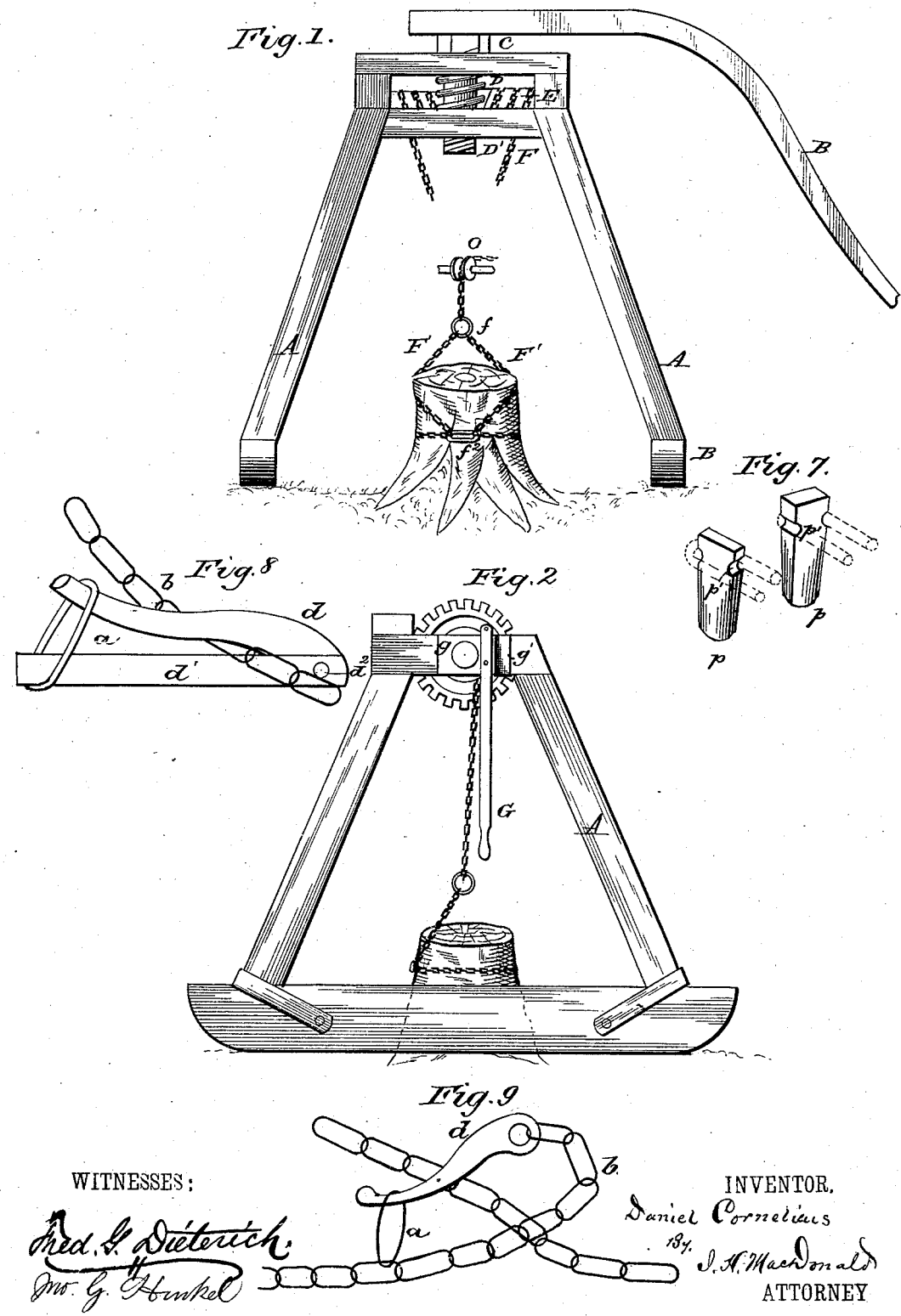

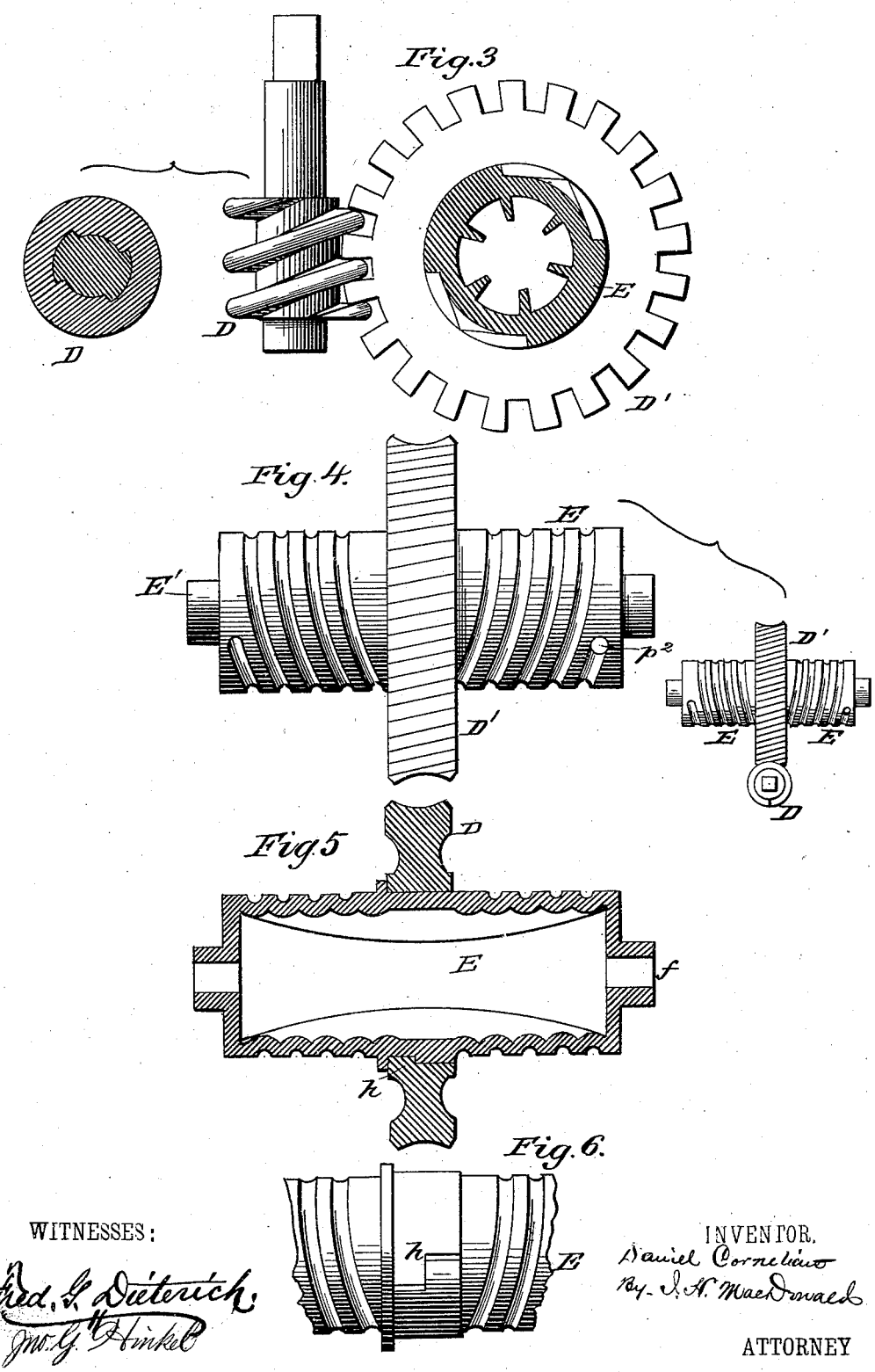

DANIEL CORNELIEUS, OF LIMA, OHIO.

STUMP-EXTRACTOR.

SPECIFICATION forming part of Letters Patent No. 287,002, dated October 23, 1883.

Application filed May 1, 1883. (No model.)

*To all whom it may concern:*

Be it known that I, DANIEL CORNELIEUS, a citizen of the United States, residing at Lima, in the county of Allen and State of Ohio, have invented certain new and useful Improvements in Stump-Extractors, of which the following is a specification, reference being had therein to the accompanying drawings.

My invention relates to improvements in stump-extractors; and it consists in certain details of construction and arrangement of the several parts, as will be hereinafter more fully set forth in the specification, and pointed out in the accompanying drawings, in which—

Figures 1 and 2 are end elevations of my device; Figs. 3 and 4, side views, partly in section, of the worm-wheel, screw, and grooved drum; Fig. 5, a section of the screw and grooved drum or spool; Fig. 6, a detail view of the spool and key for securing the spool to the sprocket-wheel; Fig. 7, a detail view, and Figs. 8 and 9 side elevations, of the fly-link.

The object of the device is to provide a cheap and effective machine for extracting stumps and roots from the ground—one that can be readily removed from place to place, and one in which the chain can be wound or unwound without reversing the power.

Referring more particularly to the drawings, A represents the frame-work of the machine mounted upon suitable runners, B. Motion is imparted to a screw, D, by means of a lever, B', actuated by horse or other suitable power. This screw imparts motion to a sprocket or worm wheel, D', upon which a grooved cylinder or spool, E, is secured by a key, such as shown at $h$, Figs. 5 and 6, no key-seat being required. As the wheel D' is turned the spool E, to which the chain F is attached, is also turned and the chain wound up. The chain F is secured to the ends of the spool E by means of the keys or plugs $p$, which enter the holes $p^1$ in the ends of the spool. Each key or plug $p$ is cut away near its head, as at $p'$, and a link or links of the chain drawn around this groove, by means of which the chain is securely attached to the spool. When the chain is wound on the drum or spool E, and it is desired to unwind it for the purpose of a new attachment to a stump or root, I do not reverse the power, but obviate this necessity, in ordinary machines, by means of a shifting device, which I will now explain. The journals E' of spool E are seated in sliding boxes $g$, Fig. 2, operated by a lever, G. A space or recess, $g'$, is left on the frame for the play of the boxing, and when this boxing is pushed back into the recess the wheel D', which is attached to the spool, is thrown out of gear with the screw, and the chain can then be drawn out by hand. The wheel D' can then be thrown back into gear with the screw, and the machine is again ready for use.

A pulley, O, may be used for a branch on the main chain; or the main chain may pass over it when it is deemed essential. I also use a fly-link consisting of the pivoted parts $d\ d'$, and held by a link, $a$, by means of which the chain can be fastened in any position and can be secured in any link. The chain can thus be shortened up, and when it is desired to release the stump I simply knock off the link $a$ from the fly-link. I may use a connecting link or ring for branch chains which extend to different stumps. The chain can be attached to the stump by means of a flat link or other suitable means.

Having thus described my invention, what I claim as new, and desire to secure by Letters Patent, is—

1. A stump-extractor consisting of a frame-work having secured thereto a screw actuated by a lever, a worm or sprocket wheel having a grooved drum or spool secured thereto, said screw and wheel being thrown into and out of gear by a shifting mechanism, as described.

2. In a stump-extractor, the combination, with a suitable supporting-frame, of a screw actuated by a lever, a wheel engaging with said screw, a spool for the chain to wind upon, the journals of said spool being seated in slotted boxes adapted to be moved in a recess in the frame by means of a suitable lever, G, whereby the reversing of the power is obviated, substantially as and for the purpose set forth.

3. In a stump-extractor, the combination, with the screw D, actuated by a lever, B', of the wheel D' and spool E, secured by a locking device, $h$, to said drum, as and for the purpose set forth.

4. In a stump-extractor, a spool, E, grooved to receive a chain or chains, F, said chains being secured thereto by the plugs or keys $p$, substantially as and for the purpose set forth.

5. In a stump-extractor, the combination, with the winding mechanism and chain or chains, of a fly-link, $d\ d'$, as described, whereby the chain can be shortened up or lengthened out, substantially as and for the purpose set forth.

In testimony whereof I affix my signature in presence of two witnesses.

DANIEL CORNELIEUS.

Witnesses:
I. H. MacDONALD,
W. J. JOHNSTON.